Patented May 25, 1954

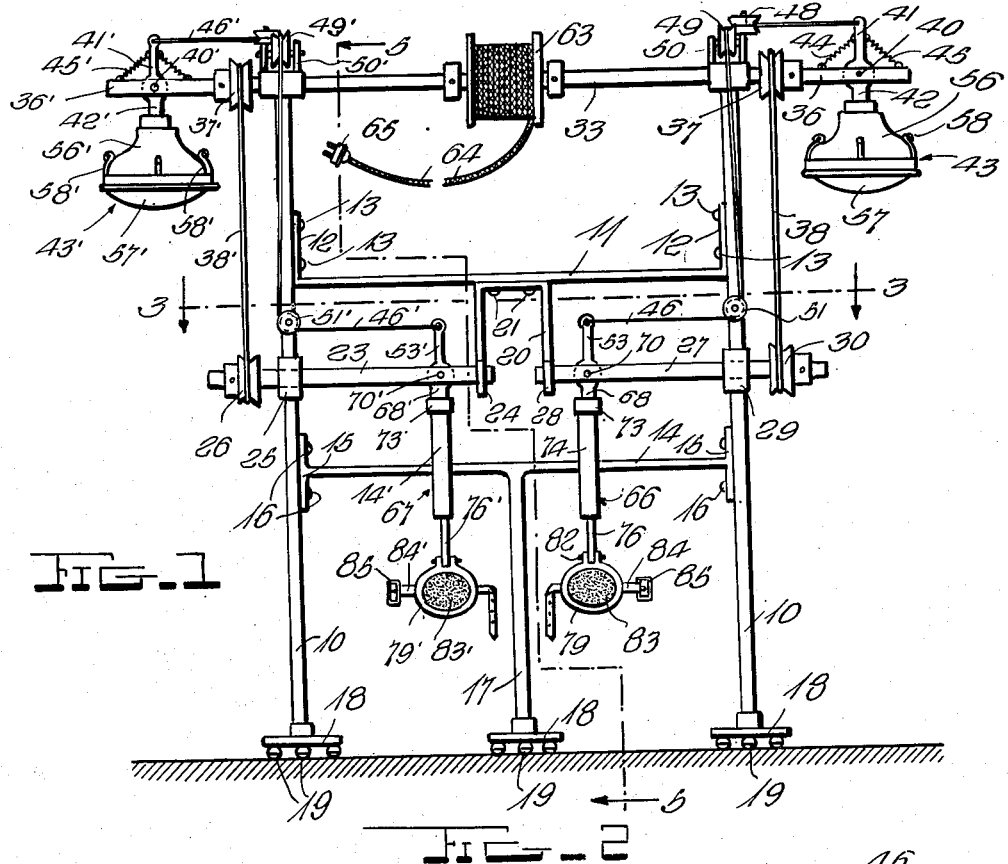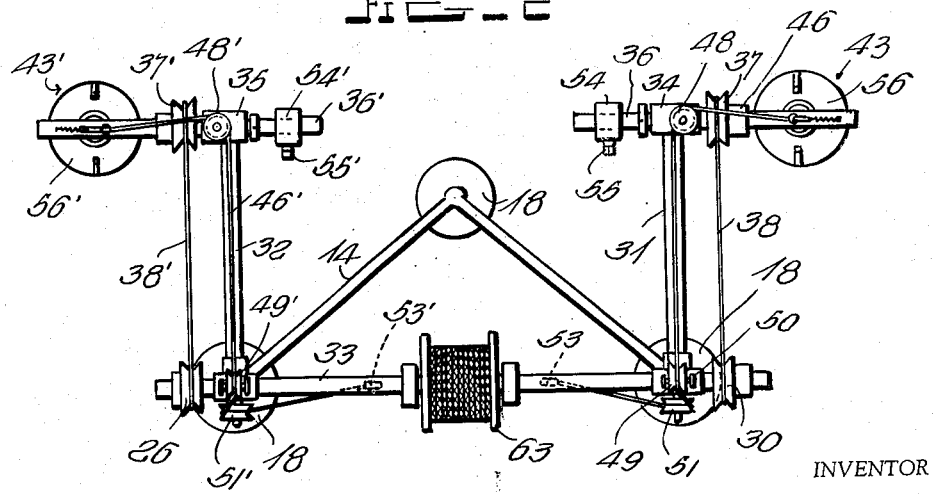

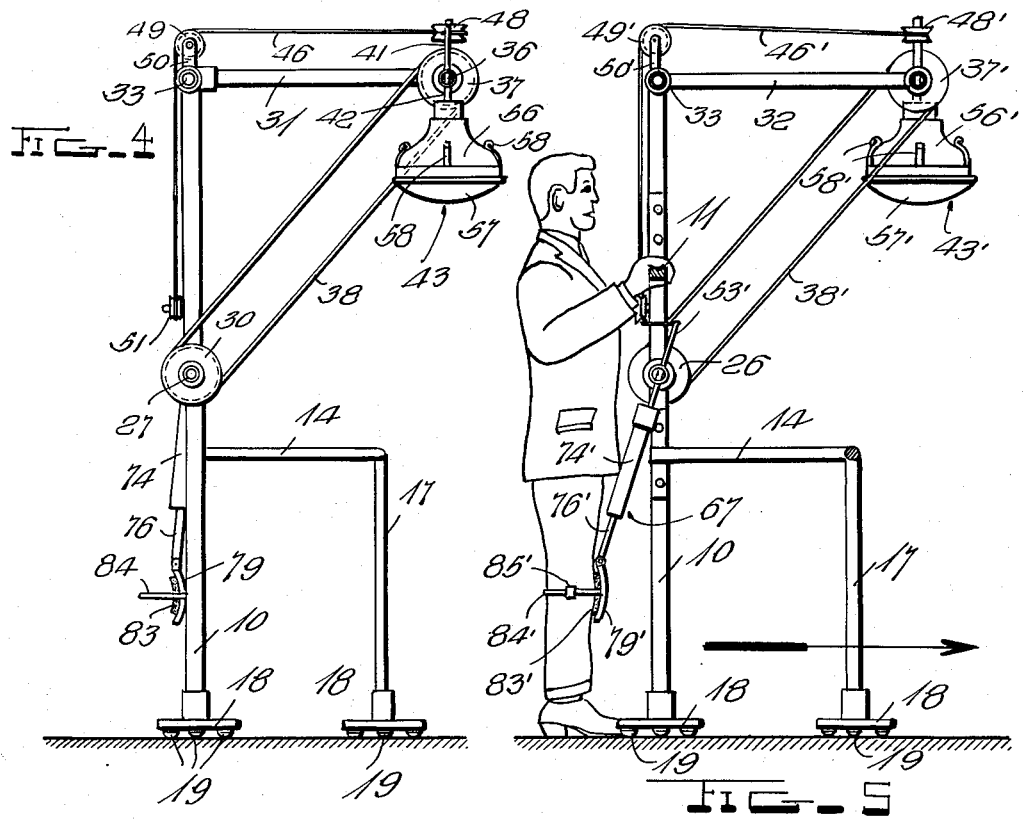

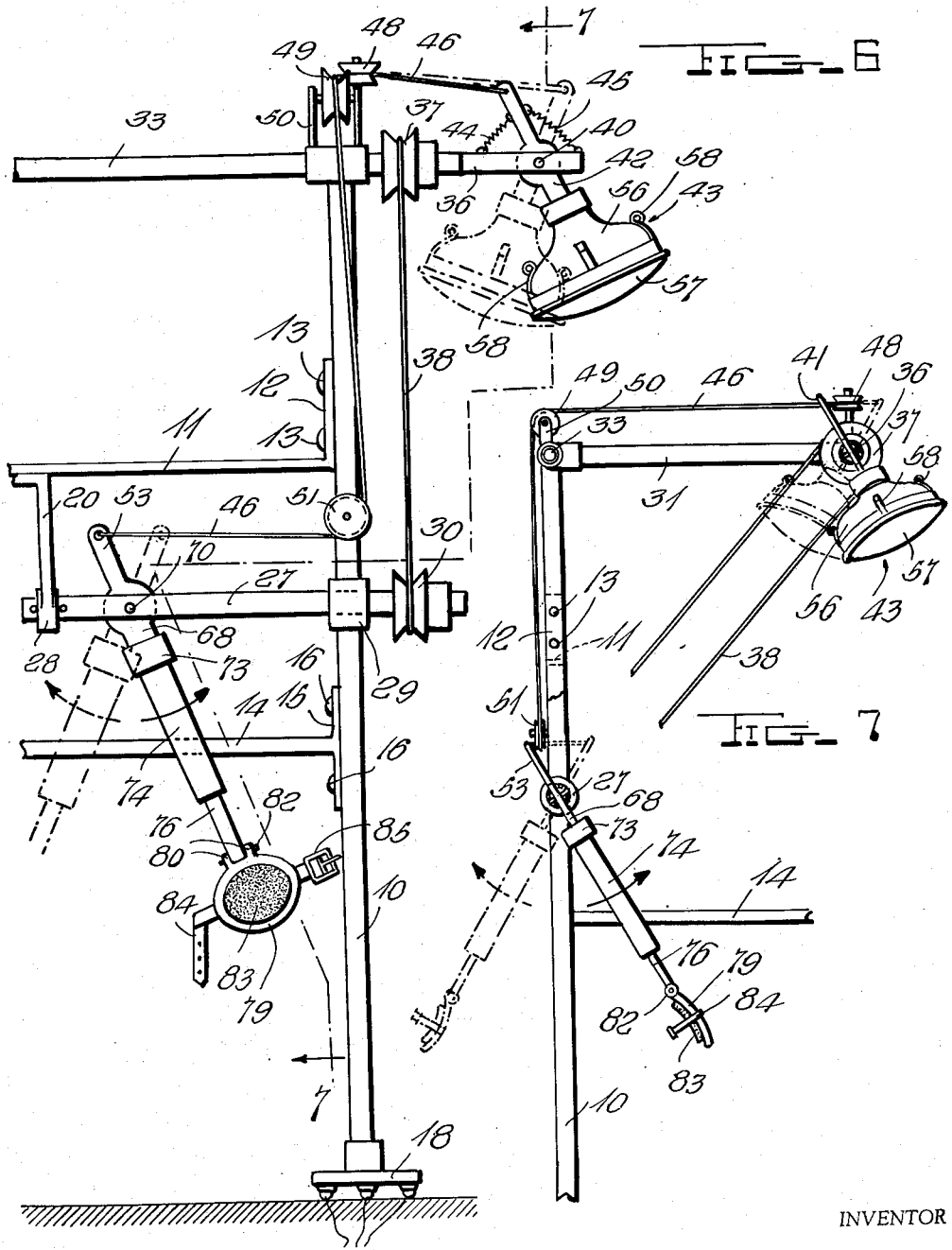

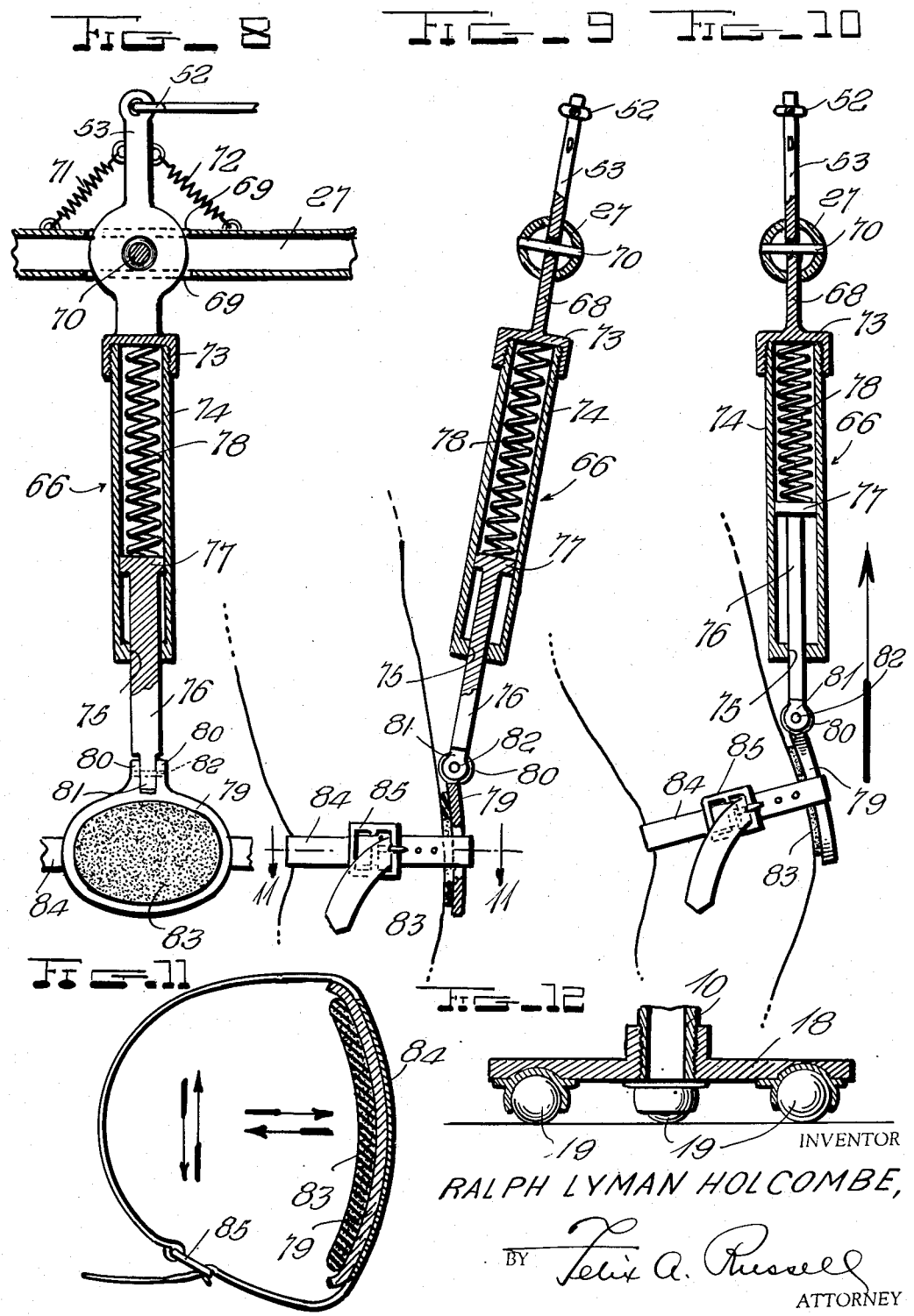

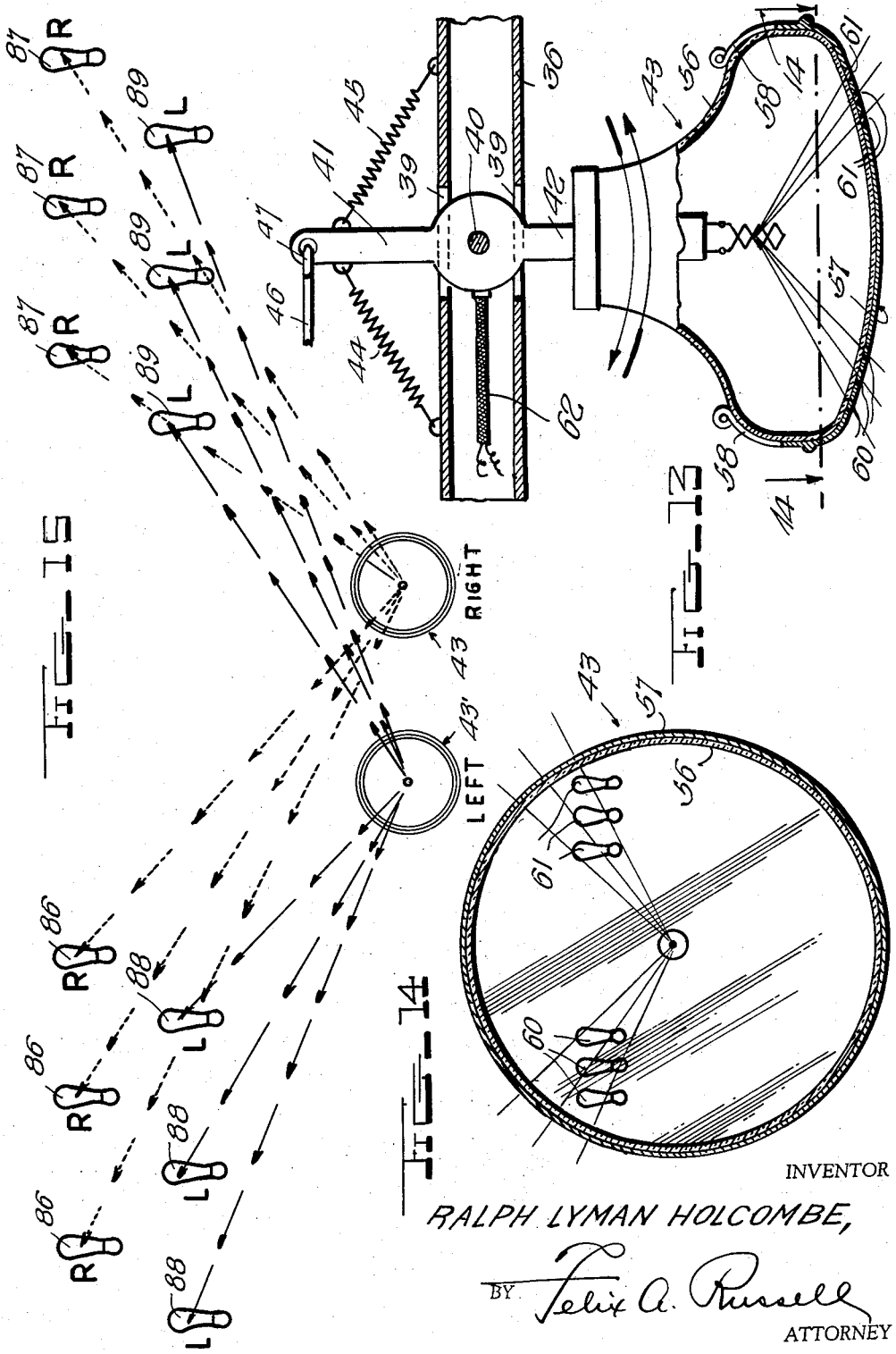

2,679,116

UNITED STATES PATENT OFFICE 2,679,116

DANCE INSTRUCTIONAL APPARATUS

Ralph Lyman Holcombe, Ada, Okla.

Application April 15, 1952, Serial No. 282,414

6 Claims. (Cl. 35—29)

The present invention relates to a dance instructional apparatus and it consists in the combinations, constructions and arrangement of parts herein described and claimed.

Generally there is provided an apparatus consisting of a frame having means whereby it may be physically moved from placed to place over a dance floor or the like by an instructor and which has means for projecting upon the floor at each side of the apparatus pluralities of lighted images of both the right and the left feet of the instructor, the movements of the images following with exactness the movements of the instructor's feet both in a forward and a rearward direction and in lateral directions together with any combination of such movement. This is accomplished by a novel harness attached to the legs of the instructor, a pair of novel projecting lamps carried by the apparatus and a novel transmission system interconnecting the harness and the lamps. The apparatus contains many other novel features which will be brought out in the specification and the apparatus is suited not only for the teaching of dancing to a plurality of students at the same time but also is adapted to the teaching of other routines and the like such as marching, drilling, et cetera. The apparatus provides to a plurality of students at one time a visual periphery cue which tells the students the complete story of when to move, which foot to move, where to move the same and how fast to move it. The instructor provides to a group of students through this apparatus a visual cue which enables the students to make the necessary visual-muscular coordination and to thereby condition themselves constantly to eventually dispense with such visual cues and respond to the audio cue provided by music and the like primarily followed by the instructor. The apparatus provides to a group of students a means for instantly learning poise, grace and skill while remaining free and unhampered from physical contact with an instructor as is conventionally the case thereby saving the student from such personal embarrassment usually attendant in the primary stages of instruction of the character set forth.

It is accordingly an object of the invention to provide a dance instruction apparatus which is simple in construction, inexpensive to manufacture and yet effective and efficient in use.

Another object of the invention is to provide, in a device of the character set forth, novel means for the simultaneous instruction by a single instructor of a plurality of students.

A further object of the invention is to provide, in a device of the character set forth, a novel leg harness forming a part of the invention.

Another object of the invention is to provide, in an apparatus of the character set forth, novel projecting lamps forming a part of the invention.

A further object of the invention is to provide, in an apparatus of the character set forth, novel transmission means interconnecting certain leg harness and certain projecting lamps both forming parts of the invention.

Other and further objects of the invention will become apparent from a reading of the following specification taken in conjunction with the drawings, in which:

Figure 1 is a rear elevational view of an embodiment of the invention,

Figure 2 is a top plan view thereof,

Figure 3 is an enlarged sectional view taken along line 3—3 of Figure 1,

Figure 4 is a side elevational view of Figure 1,

Figure 5 is a sectional view taken along line 5—5 of Figure 1,

Figure 6 is an enlarged fragmentary rear elevational view of the device illustrated in Figures 1 to 5, inclusive, illustrating the manner of transmitting lateral movements of a leg harness to a projecting lamp, both forming parts of the invention, Figure 7 is a sectional view, somewhat reduced, taken along line 7—7 of Figure 6, and illustrating the manner of transmitting forward and rearward movement of the leg harness to the projecting lamp, Figure 8 is an enlarged fragmentary rear elevational view, partly in section, of a leg harness forming a part of the invention, Figure 9 is a side elevational view of Figure 8, likewise partly in section and illustrating the position of the same as attached to an instructor's leg when such leg is moved rearwardly, Figure 10 is a view similar to Figure 9 but showing the same as it would appear as the instructor's leg is moved forwardly from the position in Figure 9, Figure 11 is an enlarged sectional view taken substantially along line 11—11 of Figure 9, Figure 12 is an enlarged fragmentary vertical sectional view of a supporting member forming a part of the invention, Figure 13 is an enlarged fragmentary vertical sectional view, partly in elevation, of a projecting lamp and its mounting, forming a part of the invention, Figure 14 is a sectional view taken along line 14—14 of Figure 13, and Figure 15 is a schematic view illustrating the manner of projecting certain lighted footsteps as practiced in the carrying out of the invention.

Referring more particularly to the drawings, there is shown therein an apparatus of the character set forth comprising a frame having a pair of spaced vertical standards 10 interconnected by a horizontal cross bar 11 having upturned feet 12 bolted or otherwise affixed, as indicated at 13, to the inner sides of the standards 10. A yoke 14 is provided with feet 15 at each end thereof which feet are affixed by screws 16 or the like to the inner sides of the standards 10 and whose apex portion extends forwardly and has affixed thereto a foreshortened vertical standard 17. Each of the standards 10 and the standard 17 has affixed to the lower end thereof a supporting plate 18 each of which is provided upon its underside with a plurality of ball-type casters 19.

An inverted U-shaped bracket 20 has its apex portion affixed centrally to the underside of the cross bar 11 by screws 21 or the like a horizontal shaft 23 is revolubly mounted in a journal 24 provided in the lower end of one of the legs of the bracket 20 and in a journal 25 provided in the adjacent standard 10 and extends outwardly of the standard 10 and has affixed thereto a pulley 26. A like shaft 27 is revolubly mounted in a journal 28 in the other leg of the bracket 20 and in a journal 29 in the other standard 10 and extends outwardly therefrom and has mounted thereon a pulley 30, it being understood that the shaft 23 is upon the left side of the apparatus as viewed from the rear while the shaft 27 is upon the right side of the apparatus, likewise as viewed from the rear.

A horizontally and forwardly extending right support arm 31 is affixed to the upper end of the standard 10 upon the right side of the apparatus as viewed from the rear while a like left support arm 32 extends from the upper end of the other standard 10. A cross bar 33 interconnects the upper ends of the standards 10.

The support member 31 has a journal 34 affixed to its forward end while the left support member 32 has a journal 35 affixed to its forward end. A horizontal shaft 36 extends revolubly through the journal 34 and has affixed thereto outwardly of the journal 34 a pulley 37 which is interconnected with the pulley 30 by means of an endless belt 38.

A bell crank lever extends through vertical slots 39 in the shaft 36 outwardly of the pulley 37 and is pivoted upon a transverse pin 40 affixed to the shaft 36. The bell crank is provided with an upper arm 41 and a lower arm 42. Affixed to the lower end of the arm 42 is a lamp structure generally indicated at 43. A pair of tension springs 44 and 45 each interconnect one side of the upper portion of the arm 41 with an adjacent portion of the shaft 36 to maintain the bell crank lever in normally vertical position. A cable 46 is connected at one of its ends, as indicated at 47, to the upper end of the arm 41 and extends inwardly and is entrained over a pulley 48 mounted atop the journal 34 and thence rearwardly to a pulley 49 carried by a bracket 50 mounted atop the adjacent standard 10 and thence downwardly to a pulley 51 carried upon the rear of such standard 10 and thence inwardly where it is attached at its other end, as indicated at 52 to an upper arm 53 of a right leg harness hereinafter to be described. A counterweight 54 is adjustably mounted upon the inner end of the shaft 36 by means of a set screw 55 and acts to balance the weight of the pulley 37 and lamp structure 43.

Since the shaft 36, the lamp structure 43, the pulleys 37, 48, 49 and 51, the cables 38 and 46 and the counterweights 54 are all duplicated in reverse upon the opposite or left side of the apparatus, as viewed from the rear, the corresponding parts just above described are primed upon such left side of the drawing.

The lamp structure 43 and the lamp structure 43' each respectively consists of a lamp 56 and 56' and an opaque shield 57 and 57'. The shields 57 and 57' are each provided with upwardly extending resilient gripping fingers 58 and 58', respectively, whereby the same may be removably attached to the respective lamps 56 and 56', and each of the shields 57 has cut therethrough a plurality of foot-shaped openings 60 upon one side thereof and a plurality of like foot-shaped openings 61 upon the other side thereof. Each of the lamps 56 and 56' is connected by an electrical cord 62 which extends through the interior of its supporting shaft and the arm 31 or 32 as the case may be and thence through the cross bar 33 where it is connected by conventional means to a retractable spool 63. A supply cord 64 is wound upon the spool 63 and is provided at its outer end with a connector plug 65 whereby the same may be connected to a suitable source of electrical current.

Referring now to the leg harness forming a part of the invention, it will be apparent from the rear view shown in Figure 1 that there is provided a right harness generally indicated at 66 and a left harness generally indicated at 67, such right and left harnesses 66 and 67 being adapted to be attached to the right and left legs respectively of an instructor utilizing the apparatus. Accordingly, only the right harness 66 will be described and the identical parts in the left harness 67 will be given primed reference characters. Referring now to the harness 66 it will be seen that there is provided a bell crank lever having an upper arm 53 and a lower arm 68 and that the lever extends through slots 69 formed in the upper and lower portions of the hollow shaft 27 and that the same is pivotally mounted upon a pin 70 extending transversely through the shaft 27. A pair of tension springs 71 and 72 interconnect the opposite sides of the upper portion of the arm 53 with adjacent portions of the upper side of the shaft 27. A collar 73 is affixed to the lower end of the arm 68 and has internally mounted therein the upper end of a vertically extending cylinder 74 whose lower end is apertured, as indicated at 75. A rod 76 extends slidably through the aperture 75 and is provided at its upper end with a piston 77. A compression spring 78 is mounted within the cylinder 74 and bears against the inner end of the collar 73 at its upper end and against the top of the piston 77 at its lower end.

A pad base 79 is provided at its upper end with a pair of apertured ears 80 for the reception therebetween of a tongue 81 which is pivotally connected thereto by means of a pin 82. The pad base is provided upon its inner face with a pad 83 of sponge rubber or like material. A strap 84 is affixed interjacent its ends to the outer side of the base 79 and one of its ends is provided with a buckle 85 adapted to adjustably engage the other end thereof.

In operation, it will be apparent that the plug 65 may be connected to any suitable source of electrical current but preferably in the ceiling of a room in which the device is to be utilized. Thereafter, it will be apparent that the apparatus may be moved as desired from place to place upon the floor of the room and that the slack in the cable 64 will be taken up at all times in conventional manner by means of the retractable spool 63 but that light will be supplied by the lamps 56 and 56' which light will be masked by the members 57 and 57' with the exception that the foot-shaped apertures 61 and 60 in the light structure 43 will project upon the floor forwardly to the left and forwardly to the right, respectively, a plurality of foot-shaped images 86 and 87, respectively, while the apertures 60 and 61 in the light structure 43' will project forwardly to the left and forwardly to the right groups of foot-shaped images 88 and 89, respectively, and it will also be apparent that the light structures 43 and 43' are so positioned upon the apparatus that the images cast thereby upon the floor will each be adjacent but in spaced relation to the images cast by the other, that is to say each of the images 88 will be in spaced relation to the left of each of the images 86, as viewed, for example, in Figure 15 while the images 89 will likewise be in spaced relation to the left of the images 87 likewise as viewed in Figure 15.

In order to operate the apparatus, an instructor will first engage the harnesses 66 and 67 upon his right and left legs, respectively by incircling his legs with the straps 84 and fastening such straps by means of the buckles 85 and 85', respectively. Thereafter the instructor will grasp the cross bar 11 in his hands and by a walking and pushing movement will cause the apparatus as a whole to move along the floor upon which it is mounted. As the walking movement takes place the shafts 23 and 27 will, of course, oscillate due to the connection of the harnesses 66 and 67 thereto by means of the pins 70 and 70'. Any vertical movement of the legs of the instructor during this action will be taken up by means of the pistons 77 and spring 76 in the cylinder 74 or the corresponding parts in the left harness 67. This action causes a corresponding oscillation of the shafts 36 and 36' through interconnection by means of the belts 38 and 38' and the pulleys over which such belts are entrained. This causes a forward and rearward movement of the images 86, 87, 88 and 89, the right harness 66 causing a forward and rearward movement of the images 86 and 87 while the left harness 67 causes a forward and rearward movement of the images 88 and 89 along the floor immediately in front and to one side of the apparatus. Thus it will be seen that any forward or rearward movement of either of the legs of the instructor will be projected in multiples by the aforesaid images to the left and right of the apparatus and slightly forwardly of either side of such apparatus.

Lateral movement of either of the legs of the instructor will be translated to the lamp structures 43 and 43' through the cables 46 and 46' since the upper arms 53 and 53' will act to reciprocate the cables 46 and 46' over the various pulleys over which they are entrained to thus move the upper arms 41 and 41' thus moving the light structures from one side to the other in a corresponding direction as the harnesses 66 and 67 are moved by the legs of the instructor. This action causes a corresponding right or left movement as the case may be in all of the images projected by such light structures.

Thus it will be seen that as the instructor moves forward or rearwardly and moves his legs from one side to the other such actions are immediately translated into corresponding movements of the images 86, 87, 88 and 89 upon the floor immediately in front of and to either side of the apparatus so that a plurality of students may follow such movements by placing their feet upon or immediately behind such images and attempting to follow the movements of such images, it being understood that any one student will first place himself behind one of the images 88 and one of the images 86 or one of the images 89 and one of the images 87 and that in either event, he will attempt to move his left foot as the image 88 or 89 moves while attempting to move his right foot as the image 86 or 87 moves. Thus it will be seen that the students may follow with exactness the movements of the instructor at all times. It will also be understood that while the apparatus is in operation, for the instruction of dance routines, for example, the instructor will coordinate his movements to a source of music in the immediate vicinity so that his movements may follow the beat of such music. Likewise it will be apparent that after a short time the students will automatically coordinate their movements to the beat of the music and that eventually the lighted images will become unnecessary so that the student himself may be able to perform the dance routines without the aid of an instructor or the presently described apparatus since he will have coordinated his movements and the routine to the beat of the music. It will also be apparent that no student will have in his immediate vicinity nor in touching relation any instructor as is conventionally the case and hence will be without the conventional preliminary embarrassment which attains in the ordinary instruction of routines of the type referred to.

It will be apparent that the shields 57 and 57' may be changed for similar shields having a more or less number of openings 60 and 61 therein to accommodate a greater or lesser number of students and it will likewise be apparent that the ratio of size between the pulleys 36 and 37 and the pulleys 26 and 37' may be regulated so that the exact forward and rearward movements of the legs of the instructor will be made by the images cast upon the floor by the lamp structures 43 and 43', and that by regulating the length of the upper arms 41 and 41', exact lateral movements of the legs of the instructor will likewise be translated upon the floor by the aforesaid images.

While but one form of the invention has been shown and described herein, it will be readily apparent to those skilled in the art that many minor modifications may be made without departing from the spirit of the invention or the scope of the appended claims.

What is claimed is:

1. An apparatus of the character described comprising a frame, a pair of leg harness members carried by said frame, a pair of lamps carried by said frame, means carried by said frame and interconnecting each leg harness member with one of said lamps whereby said interconnected members move in unison, and a lamp shield for each of said lamps, said shields each having a plurality of perforations each adapted to cast an image of a human foot upon the floor in front of and to one side of said frame.

2. An apparatus of the character described comprising a frame, a pair of leg harness members carried by said frame, a pair of lamps carried by said frame, means carried by said frame and interconnecting each leg harness member with one of said lamps whereby said interconnected members move in unison, and a lamp shield for each of said lamps, said shields each having a plurality of perforations each adapted to cast an image of a human foot upon the floor in front of and to one side of said frame, said leg harness members each including a transverse hollow shaft having an upper and lower slot therein, a bell crank lever extending through said slots and pivoted to said shaft, a cylinder at the lower end of said bell crank lever, a piston in said cylinder, a rod connected at its upper end to said piston, a pad base pivotally connected to the lower end of said rod, a pad affixed to the inner face of said pad base, a strap affixed to the outer face of said base intermediate its ends, a buckle affixed to one end of said strap, and a compression spring in said cylinder bearing against the upper end of said cylinder and against said piston.

3. An apparatus of the character described comprising a frame, a pair of leg harness members carried by said frame, a pair of lamps carried by said frame, means carried by said frame and interconnecting each leg harness member with one of said lamps whereby said interconnected members move in unison, and a lamp shield for each of said lamps, said shields each having a plurality of perforations each adapted to cast an image of a human foot upon the floor in front of and to one side of said frame, each of said lamps being mounted for forward and rearward and lateral oscillatory movement upon said frame.

4. An apparatus of the character described comprising a frame including a pair of spaced vertical standards, an upper and a lower cross bar interconnecting said standards, a horizontally disposed V-shaped yoke having its legs connected to said standards, a fore-shortened standard affixed to the apex portion of said yoke, a supporting plate affixed to the lower end of each of said standards, a plurality of ball-type casters carried on the underside of each of said plates, an inverted U-shaped bracket centrally affixed to the lower cross bar, a pair of hollow shafts each journaled in one leg of said bracket and in an adjacent standard, an arm extending forwardly from the upper end of each of the pair of standards, a laterally extending hollow shaft journaled in the outer end of each arm, belt and pulley connections between the shafts on each side of the frame, a leg harness member pivoted for lateral oscillation in each of the first-mentioned hollow shafts, a lamp structure pivoted for lateral oscillation in each of the shafts carried by said arms, a cable interconnecting the lamp structure and leg harness on each side of said frame, pulleys carried by said frame for guiding said cables, and means in each lamp structure for projecting a plurality of foot images upon the floor forwardly and at either side of said frame.

5. An apparatus of the character described comprising a frame including a pair of spaced vertical standards, an upper and a lower cross bar interconnecting said standards, a horizontally disposed V-shaped yoke having its legs connected to said standards, a fore-shortened standard affixed to the apex portion of said yoke, a supporting plate affixed to the lower end of each of said standards, a plurality of ball-type casters carried on the underside of each of said plates, an inverted U-shaped bracket centrally affixed to the lower cross bar, a pair of hollow shafts each journaled in one leg of said bracket and in an adjacent standard, an arm extending forwardly from the upper end of each of the pair of standards, a laterally extending hollow shaft journaled in the outer end of each arm, belt and pulley connections between the shafts on each side of the frame, a leg harness member pivoted for lateral oscillations in each of the first-mentioned hollow shafts, a lamp structure pivoted for lateral oscillation in each of the shafts carried by said arms, a cable interconnecting the lamp structure and leg harness on each side of said frame, pulleys carried by said frame for guiding said cables, and means in each lamp structure for projecting a plurality of foot images upon the floor forwardly and at either side of said frame, said leg harness members each including upper and lower slots formed in their associated shafts, a bell crank lever extending through said slots and pivoted to said shaft, a cylinder at the lower end of said bell crank lever, a piston in said cylinder, a rod connected at its upper end to said piston, a pad base pivotally connected to the lower end of said rod, a pad affixed to the inner face of said pad base, a strap affixed to the outer face of said base intermediate its ends, a buckle affixed to one end of said strap, and a compression spring in said cylinder bearing against the upper end of said cylinder and against said piston.

6. An apparatus of the character described comprising a frame including a pair of spaced vertical standards, an upper and a lower cross bar interconnecting said standards, a horizontally disposed V-shaped yoke having its legs connected to said standards, a fore-shortened standard affixed to the apex portion of said yoke, a supporting plate affixed to the lower end of each of said standards, a plurality of ball-type casters carried on the underside of each of said plates, an inverted U-shaped bracket centrally affixed to the lower cross bar, a pair of hollow shafts each journaled in one leg of said bracket and in an adjacent standard, an arm extending forwardly from the upper end of each of the pair of standards, a laterally extending hollow shaft journaled in the outer end of each arm, belt and pulley connections between the shafts on each side of the frame, a leg harness member pivoted for lateral oscillation in each of the first-mentioned hollow shafts, a lamp structure pivoted for lateral oscillation in each of the shafts carried by said arms, a cable interconnecting the lamp structure and leg harness on each side of said frame, pulleys carried by said frame for guiding said cables, means in each lamp structure for projecting a plurality of foot images upon the floor forwardly and at either side of said frame, and means for normally maintaining said lamp structures and said leg harnesses in a vertical condition.

References Cited in the file of this patent

UNITED STATES PATENTS

| Number | Name | Date |
|---|---|---|
| 2,402,109 | Williams | June 11, 1946 |
| 2,605,557 | Van Deventer | Aug. 5, 1952 |